US008332510B2

(12) United States Patent
Khosravi et al.

(10) Patent No.: US 8,332,510 B2
(45) Date of Patent: Dec. 11, 2012

(54) PROXY DETECTION BY SERVICE PROCESSOR

(75) Inventors: Hormuzd Khosravi, Portland, OR (US); Dominic Fulginiti, Beaverton, OR (US); Avigdor Eldar, Jerusalem (IL); Michael Navon, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 12/753,427

(22) Filed: Apr. 2, 2010

(65) Prior Publication Data

US 2011/0246633 A1    Oct. 6, 2011

(51) Int. Cl.
    G06F 15/16    (2006.01)
(52) U.S. Cl. .................. 709/224; 709/202; 709/227
(58) Field of Classification Search .................. 709/203, 709/217–225, 227–229, 202
    See application file for complete search history.

(56) References Cited

U.S. PATENT DOCUMENTS 7,039,713 B1 * 5/2006 Van Gunter et al. .......... 709/229
2004/0266454 A1 * 12/2004 Nielsen et al. ............. 455/456.1

* cited by examiner

Primary Examiner — David Lazaro
(74) Attorney, Agent, or Firm — Schwabe, Williamson & Wyatt, P.C.

(57) ABSTRACT

Embodiments provide methods, apparatus, and systems that enable an embedded processor to detect and configure one or more network access settings. The network access settings may enable the embedded processor to communicate over a network, via out-of-band messages, with a management server or service. Other embodiments may be disclosed or claimed.

20 Claims, 4 Drawing Sheets

PROXY DETECTION BY SERVICE PROCESSOR

TECHNICAL FIELD

Embodiments of the present disclosure relate to the field of embedded devices, and, more specifically, to proxy detection for embedded devices.

BACKGROUND

Platform management may be facilitated using either in-band tools or out-of-band (OOB) tools. A typical in-band tool comprises an agent that is hosted by an operating system (OS) running on a given platform. A central management server may be used to interact with the agents running on various platforms to perform remote management. OOB tools, on the other hand, enable platform management to be performed without OS complicity, providing platform-independent support. OOB tools may include a separate management processor that is employed to perform various management operations independent of the host (OS). While this independence may enable management when the host OS ceases to function or is in a powered off state, it also isolates the OOB tools from various settings and configurations.

BRIEF DESCRIPTION OF THE DRAWINGS

Embodiments of the present disclosure will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent. Additionally, the description of various operations does not imply that all operations are required for each embodiment. Rather, while described in conjunction with one another, those of ordinary skill in the art will readily understand that various operations may be independent of the operations they are described with.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for detection and configuration of one or more proxy settings for an out-of-band management solution are provided. The terminology "out-of-band" (OOB) may refer to a condition where the operating system (OS) running within an application environment hosted by an application processor is unaware of the existence of the OOB communication channel or any of its functions. This will be described in more detail herein.

The detection and configuration of one or more proxy settings enables an OOB tool, such as an embedded device, to make outbound connections in an environment where a proxy server, such as a network access proxy server, is in place to control access to a network, e.g., the Internet. For example, an embedded device, such as a service processor, operating within a host computing device and independent of the host computing device, may initiate an out-of-band remote connection to a management server or service. The management server or service may be outside of a local area network of the host computing device, thereby requiring communication over, for example, the Internet. Through communication with the service processor, the management entity may perform various operations on the host device.

Figure 1:
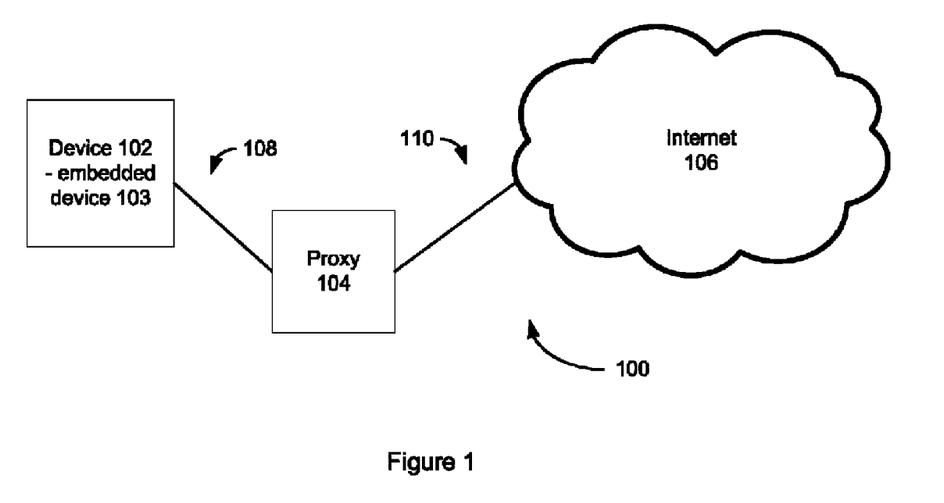
FIG. 1 illustrates a communication system, in accordance with various embodiments.

Referring to FIG. 1, an overview diagram of a communication system 100 is illustrated in accordance with various embodiments of the present disclosure. System 100 includes a computing device 102, a proxy server 104, and a representation of the Internet 106. The computing device 102 may include among other things, embedded device 103 incorporated with embodiments of the teachings of the present disclosure. The computing device 102, except for the embedded device incorporated with embodiments of the present teachings, may be any type of device that is capable of accessing the Internet 106 including, but not limited to, personal computers, laptop computers, netbooks, mobile devices, tablets, and personal cell phones. The proxy server 104 may be a network access proxy server such as a web proxy, HTTP proxy, or other proxy server, the disclosure is not to be limited in this regard.

In various embodiments, the computing device 102 and the proxy server 104 may be included in a network such as, but not limited to, a local area network. Furthermore, the computing device 102 may be coupled to the proxy server 104 via a connection 108. Connection 108 may be a wireless or wired connection in accordance with one or more protocols. Proxy server 104 may act as a gateway to Internet 106 and route one or more requests to various remote computing devices via connection 110, which may also include wired or wireless connections.

In one embodiment, computing device 102 may include, among other things, an application processor, memory, a communication interface, and a service processor (not illustrated). Computing device 102 may be configured to host, via the application processor, an application environment. The application environment may enable use of various programs including, but not limited to, a host operating system. In addition to the application processor, the computing device 102 may include a service processor that is configured to operate independent of the application environment hosted by the application processor of the host device. The service processor may be configured to detect one or more network access settings associated with the computing device 102 to enable the service processor to access the Internet 106 via the proxy server 104. Based on the detection and configuration of the one or more network access settings, the service processor may be further configured to transmit an OOB signal to a management entity via the proxy server 104. In this manner, proxy settings for OOB solutions may remain autonomous of the application environment of the host and of user involvement.

Figure 2:
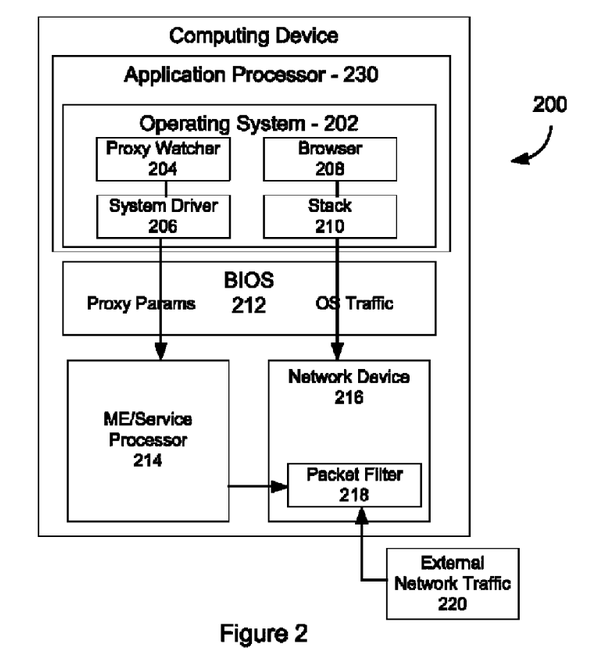
FIG. 2 illustrates a computing device for use to practice various embodiments.

Referring to FIG. 2, a computing device 200 suitable for use as computing device 102 of FIG. 1, in accordance with various embodiments, is illustrated. The computing device 200 may include a proxy watcher 204, a system driver 206, a browser 208, a stack 210, and an operating system 202 hosted by an application processor 230, a basic input output system (BIOS) 212, a ME/service processor 214 (embedded device 103), a network device 216, a packet filter 218, and external network traffic 220.

In one embodiment, the ME/service processor 214 may analyze traffic coming from an application hosted by the application processor 230, such as operating system 202, to discover a likely proxy server. To obtain the OS traffic, the ME/service processor 214 may configure one or more packet filters 218 in a network device 216. The one or more packet filters 218 may be configured to detect packets from the OS that have host names, or alternatively, IP addresses embedded in the body of the packet. Such packets may be indicative of a protocol such as HTTP where proxy servers are typically used. This is particularly true when the packets include embedded host names/addresses that resolve to a public Internet address range.

Once the ME/service processor 214 has obtained the packets from the packet filter 218, it may analyze the packets to determine the one or more network access settings. The analysis, in various embodiments, may include testing the destination address in the packets headers to see if it is a proxy server such as a network access proxy server. Once the proxy server has been identified by the ME/service processor 214, the proxy server may be enabled to transmit and receive OOB signals via a network, such as the Internet. The transmission of the OOB signals may occur independent of the application environment hosted by the application processor 230 and the applications executing within the application environment. Consequently, regardless of the state of the application processor 230, or host OS 202, the ME/service processor 214 is able to transmit and receive various signals via the Internet, even when a network access proxy is utilized as a gateway to the Internet.

In another embodiment, the ME/service processor 214 may analyze traffic on a nearby network, such as a local area network, to discover a likely network access proxy. In various embodiments, a host computer 200 may be included in a local area network, such as a business network. The ME/service processor 214 may receive and analyze packets, independent of a host OS, that were not addressed to it in order to learn an address of the proxy server. For example, the ME/service processor 214 may receive packets that were intended for one or more other devices within the local area network, without disturbing receipt of such packets by the other devices. To receive these packets, the ME/service processor 214 may configure the one or more packet filters 218 to snoop external network traffic 220. In other words, the packet filters 218 may intercept messages intended for various other devices operating on a network associated with the computing device 200. To receive the packets, the ME/service processor 214 may configure the packet filter 218 of the network device 216 such that a limited number of packets can be filtered that appear to have host names or IP addresses embedded in the body of the packet.

As described previously, once the ME/service processor 214 has obtained the packets from the packet filter 218, it may analyze the packets to determine the one or more network access settings. The analysis, in various embodiments, may include testing the destination address in the packets headers to see if it is a proxy server such as a network access proxy server. Once the proxy server has been identified by the ME/service processor 214, the proxy server may be enabled to transmit and receive OOB signals via a network, such as the Internet. The transmission of the OOB signals can be independent of the application environment hosted by the application processor 230 and the applications executing within the application environment. Consequently, regardless of the state of the application processor 230, or host OS 202, the ME/service processor 214 is able to transmit and receive various signals via the Internet, even when a network access proxy is utilized as a gateway to the Internet.

In another embodiment, the ME/service processor 214 may provide a user a configuration screen through a BIOS 212 to complete a network access proxy configuration. By utilizing the BIOS 212, a user may be capable of configuring one or more proxy settings for the ME/service processor 214 even when the OS 202 is inoperative. In various embodiments, a user may invoke this interface at any time or the system could automatically present an interface to the user when detection and configuration by other means have failed. After detection and configuration of the network access proxy server via the ME/service processor 214, one or more OOB messages may be transmitted across the Internet via the network access proxy, as described previously.

In various other embodiments, the ME/service processor 214 may utilize other methods to discover a network access proxy. For example, the ME/service processor 214 may utilize Web Proxy Auto Detect protocols, or Dynamic Host Configuration Protocol (DHCP) to retrieve IP address assignments and other configuration information. For example, the service processor may snoop for DHCP packets using one or more CB filters. Once a network access proxy server has been detected, the service processor may utilize the information to transmit or receive one or more OOB signals, as previously described.

In various embodiments, the ME/service processor 214 may rely on one or more applications hosted by the application processor 230. The ME/service processor 214 may still be configured to operate independent of the application processor 230, and may transmit one or more OOB signals independent of the application processor 230. For example, one or more components may be resident within the application environment hosted by application processor 230, for example, the operating system 202 may include proxy watcher 204.

Proxy watcher 204 may be a software component which attempts to be in a persistent or periodic running state. The proxy watcher 204 may be configured to watch for changes in proxy configuration in any known web browsers 208 that are similarly resident within the host operating system 202. If any settings or configurations are changed, the proxy watcher 204 may first attempt to validate the new settings by contacting the proxy server. If the settings are valid, the proxy watcher 204 may make a system call through a system driver 206 to ME/service processor 214 to notify it of the new one or more proxy settings which can be used within the network. In other words, the service processor may receive the one or more network access settings from the proxy watcher 204. Alternatively, if the one or more settings are determined to be invalid, the proxy watcher may disregard the one or more settings.

In various other embodiments, rather than polling for the one or more new or changed proxy settings, where the proxy watcher 204 wakes up periodically to determine if any changes have been made, the proxy watcher 204 can register for OS 202 events such as link up/new IP address which can be an indication that the network environment, and potentially, the one or more proxy settings have changed. Because such changes may require time for automatic configuration, such as a proxy settings switch, a predetermined time period may be utilized prior to notification of the new settings to the ME/Service processor 214.

Once the ME/service processor 214 has received the one or more settings related to the network access proxy, the ME/service processor may be configured to transmit and receive OOB signals to a management entity via the detected network access proxy. The transmission and receipt of the OOB signals can be independent of the host OS 202 or other applications hosted by the application processor 230.

In various embodiments, when automated detection and configuration have failed, an error indication may be presented to a user that include what is known about the network for troubleshooting, for example, by a technician. This may include messages related, but not limited to: link up, DHCP works, DNS works, appears to be proxy/firewall block that can be discovered or resolved automatically, etc. Such information may facilitate a network administrator in remedying various issues.

In various embodiments, as previously described, the ME/service processor may be configured to operate and communicate OOB signals independent of the host OS associated with an application environment. Such operation and communication capabilities may facilitate remote access when either the host OS is non-operative or powered off. In various embodiments, however, there may be a need or efficiency involved with the ME/service processor interacting with the application environment hosted by the application processor.

Figure 3:
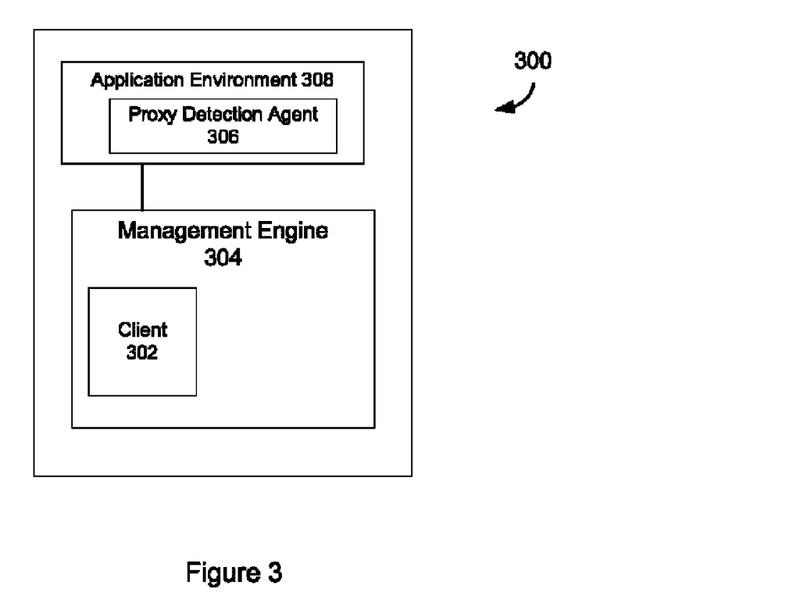
FIG. 3 illustrates a computing device for use to practice various embodiments.

Referring to FIG. 3, a block diagram of a computing device 300, suitable for use as computing device 102 of FIG. 1, in accordance with various embodiments, is illustrated. The computing device 300 may include an application environment 308 hosted by an application processor (not illustrated), a proxy detection agent 306, a management engine (ME) 304, and a client 302 hosted by the ME 304.

The application environment 308, in various embodiments, may be configured to host one or more programs, for example a proxy detection agent 306. The proxy detection agent 306 may reside in the application environment and detect or manually receive one or more settings for a network access proxy. For example, the proxy detection agent 306 utilize one or more protocols, such as a Web Proxy Auto-discovery (WPAD) protocol to determine the one or more network access proxy settings. Alternatively, the proxy detection agent 306 may be manually configured to contact a network access proxy. Other manners of detecting and configuring network access through a network access proxy within an application environment are contemplated.

After the proxy detection agent 306 has detected and configured the application environment 308 for communication with the network access proxy, client 302 hosted by management engine 304 may connect to the network access proxy via the proxy detection agent 306. In various embodiments, this may include determining that a host operating system of the application environment is operational and configured to communicate with the network access proxy. This may enable the management engine 304, via the client 302, to access the Internet for OOB communication.

In various embodiments, the client 302 is configured to communicate through the proxy detection agent 306 resident within the application environment 308. Through this communication, the ME 304 does not have to determine or be synchronized with the various settings within the application environment 308, for example, a user's credentials. In scenarios where the application environment 308 utilizes a directory, such as an active directory, to cache various credentials, the ME 304 can utilize the credentials without having to generate a similar cache location within the ME 304. Additionally, in situations where the ME 304 or other OOB firmware or hardware cannot share a network device at the same time, for example due to constraints of the device or the fact that the OOB hardware/firmware has not been enabled for access internally to that device (e.g. USB modem, 802.11 device, 3G card, etc.) the application environment 308 may act as a proxy for the ME 302.

Figure 4:
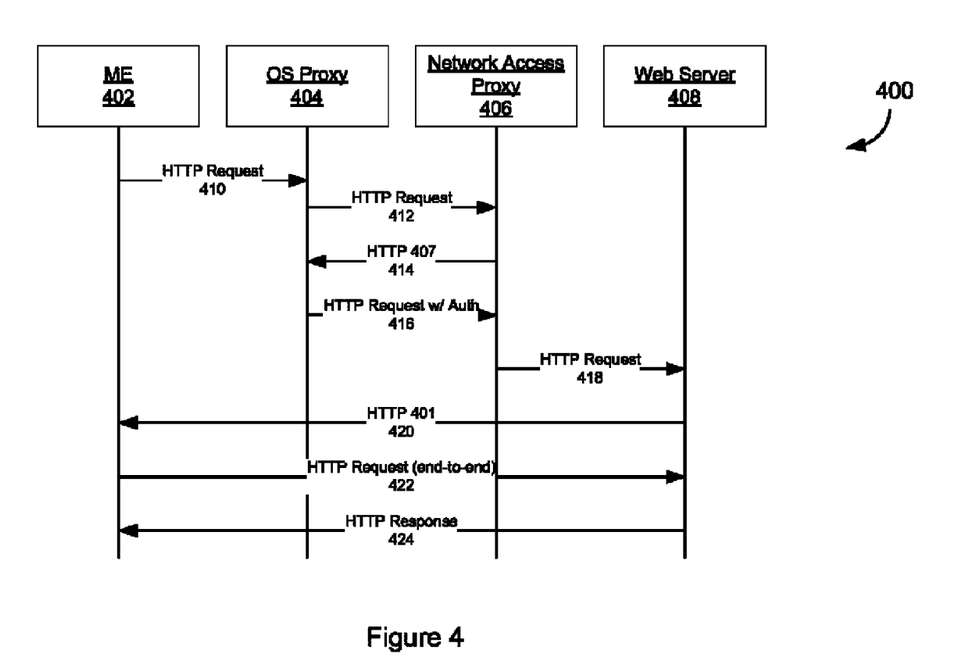
FIG. 4 illustrates a signal diagram in accordance with various embodiments

Referring now to FIG. 4, a signal flow diagram 400, in accordance with various embodiments, is illustrated. The signal flow diagram 400 may illustrate the use of the application environment 308 as a proxy for the management engine 402 (illustrated as 304 in FIG. 3). At 410, the ME 402 may transmit a request, for example an HTTP request, to the Proxy detection agent 306 of FIG. 3, which may act as OS proxy 404, that is the proxy detection agent 306 is acting as a proxy for the ME 402. The OS proxy 404 may forward the HTTP request 412 to the Network access proxy 406, and in response receive an HTTP response from the network access proxy 406 requesting proxy authentication 414. The OS proxy 404, acting on behalf of the ME 402 may the forward the HTTP request with authentication 416 to the network access proxy 406.

After the request has been authenticated, the network access proxy 406 may transmit the HTTP request 418 across a network, such as the Internet, to a web server 408. In various embodiments, the HTTP request may be an OOB communication and the web server may be a remote management server or service. In response to the request 418, the web server 408 may transmit an HTTP unauthorized message 420 to the ME 402 via the network access proxy 406 and the application environment or OS proxy 404. In response, the ME 402 may transmit the HTTP request (end-to-end) 422 to the web server 408 and ultimately receive the HTTP response 424. This flow diagram is merely exemplary in nature. Other sequences are contemplated.

Figure 5:
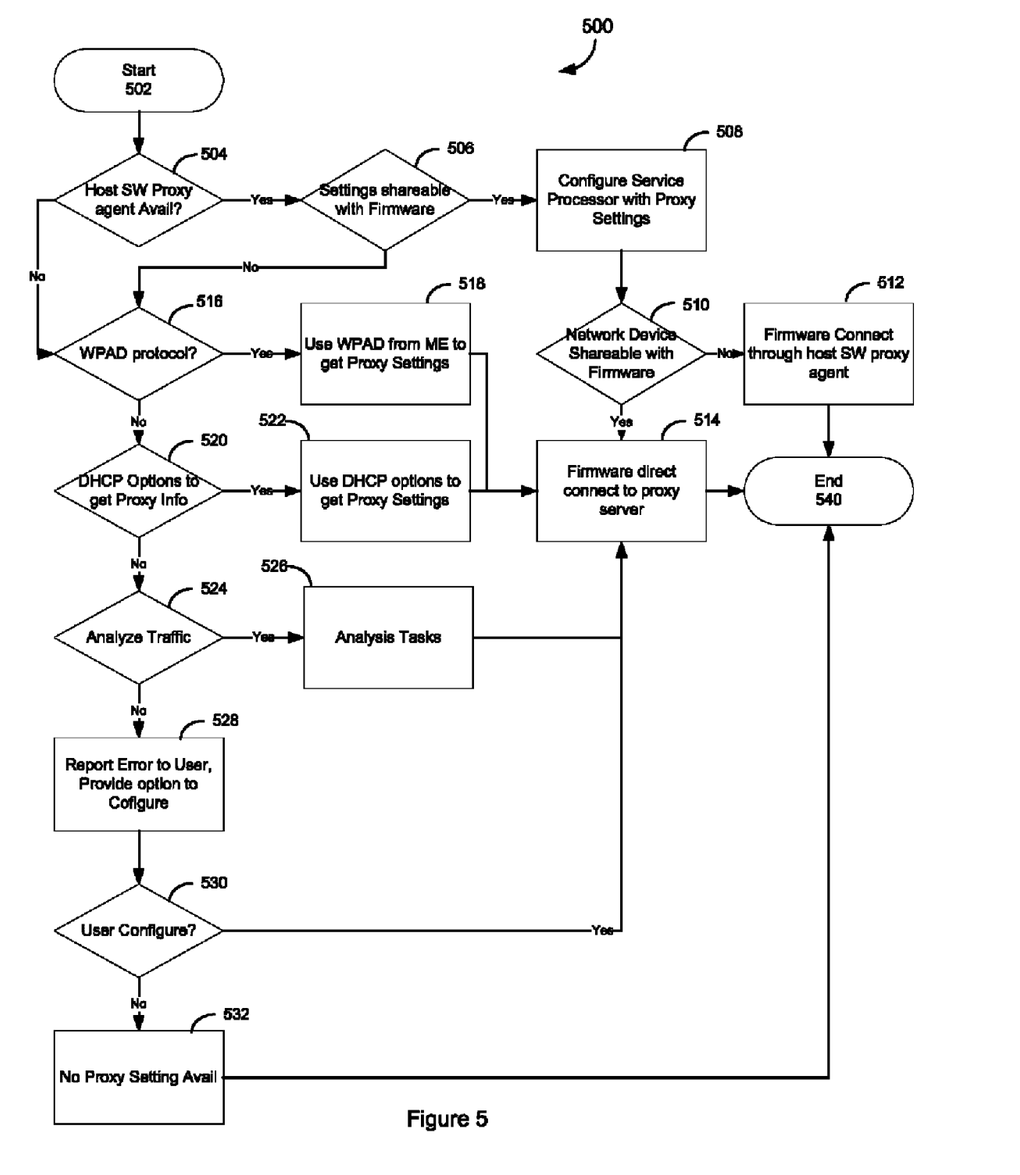
FIG. 5 illustrates a flow diagram in accordance with various embodiments.

Referring to FIG. 5, a flow diagram, in accordance with various embodiments, is shown. As illustrated, the flow diagram includes multiple operations that may be utilized by an embedded device, such as a service processor, to detect and configure one or more network access proxy settings. While the disclosure will discuss these various methods with reference to the diagram, their order is not to be construed in a limiting manner, nor is it intended that all methods are required for all embodiments. Rather it is expressly stated that the various methods may be utilized independent of others or in addition to others without limitation.

In various embodiments, the underlying method or process may be implemented as machine-readable or accessible instructions utilizing any of many different programming codes stored on any combination of machine accessible media such as volatile or nonvolatile memory or other mass storage device. For example, the machine-readable instructions may be embodied in a machine-accessible medium such as a programmable gate array, an application specific integrated circuit, an erasable programmable read only memory, a read only memory, a random access memory, a magnetic media, an optical media, and/or any other suitable type of medium.

In various embodiments, the method may start at block 502 and progress to block 504 where it is determined if a host software proxy agent is available. The host software proxy agent may be a proxy detection agent as described with reference to FIG. 2. If the host software proxy agent is available a determination is made as to whether the settings are shareable with the embedded device, such as a service processor, at block 506. If the one of more settings are shareable, the service processor may be configured with the proxy settings at block 508. At block 510, a determination is made as to whether the network device is shareable with the service processor. If the network device is shareable, the service processor may directly communicate with the network access proxy server at block 514 and the method may then end at block 540. In various embodiments, communication may include the transmission or receipt of one or more OOB signals.

Returning to block 510, if the network device is not shareable between the service processor and the host device, the service processor may connect to the network access proxy server through a host software proxy agent and the method may again end at 540. In this manner, the host software proxy agent may act as a proxy for the service processor.

Returning to block 504, if a host software proxy agent is unavailable, the method may continue to block 516 where the service processor may determine if a WPAD protocol is available within the host OS. In various embodiments, the host software proxy agent may be unavailable because there is no proxy agent, or alternatively, the OS is unavailable. If a WPAD protocol is available at block 516, the service processor may utilize the protocol to get the proxy settings at block 518, directly connect to the network access proxy server at block 514, and the method may end at block 540. Again, the method ending may include the transmission and receipt of one or more OOB signals.

If at block 516, no WPAD protocol is available, the method may progress to block 520 where it is determined whether DHCP may be utilized to obtain the proxy info. If the settings may be obtained, the method may progress to 522 where the proxy settings are retrieved, and again, the embedded device may directly connect to the proxy server at block 514 to transmit and or receive OOB signals.

Returning to block 520, if there are no DHCP options available to obtain the proxy settings, the method may continue to block 524 where the embedded device may attempt to analyze traffic. In various embodiments, the traffic may be from an application hosted by the application environment, for example the host OS, or in other embodiments, it may be traffic intended for various other devices located, for example, within the same local area network. In various embodiments, analyzing the packets may include capturing HTTP packets from the application environment or local area network using one or more filters, parsing the body of the HTTP packets for IP addresses or host names, determining if any of the IP address or host names are public or private, and determining a proxy server associated with the packets. If one or more settings for the network access proxy server are determined, the embedded device may directly connect with the proxy server at block 514 and the method may end at block 540.

If the analysis of packet traffic did not result in determining one or more network access settings, at block 528, the service processor may report an error to a user of the device and provide an option for manual configuration. At block 530, if manual configuration is utilized, the embedded device may directly communicate with the network access proxy server at block 514 and the method may end at block 540.

Returning to block 530, if user does not configure the embedded device manually, no proxy setting may be available 530, and the method may end at block 540. If the method ends at block 540, OOB communication may not be enabled for a management entity disposed across the network access proxy server, however, remote management may still be enabled for a remote entity disposed within the local area network of the host device.

Figure 6:
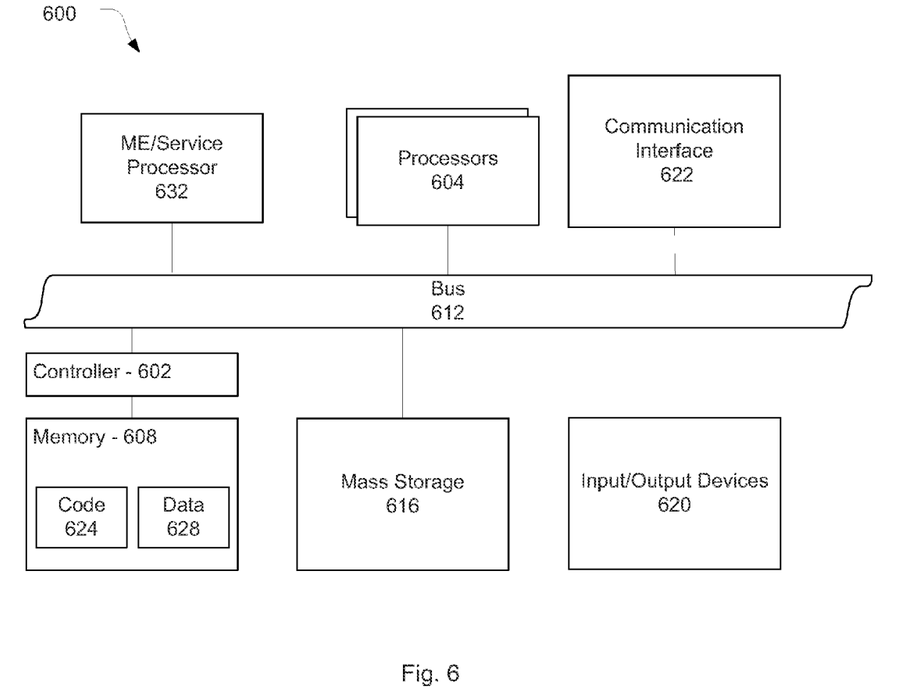
FIG. 6 illustrates a system in accordance with various embodiments.

Referring now to FIG. 6, a computing system suitable for use to practice the method described, in accordance with various embodiments, is illustrated. As shown, computing system/device 600 may include one or more application processors 604, a management engine/service processor 632, and system memory 608. Additionally, computing system/device 600 may include mass storage devices 616 (such as diskette, hard drive, CDROM and so forth), input/output devices 620 (such as keyboards, joysticks, and a mouse), and communication interfaces 622 (such as network interface cards, modems, antennas, transceivers, transponders, and so forth). The elements may be coupled to each other via system bus 612, which represents one or more buses. In the case of multiple buses, they may be bridged by one or more bus bridges (not shown). Finally, controller 602 may be provided and configured to operate memory 608. In embodiments, some or all of the functions of controller 602 could be effectively implemented within memory 608. Each of the elements of computer system/device 600 may perform its conventional functions known in the art. In particular, system memory 608 and mass storage 616 may be employed to store a working copy and a permanent copy of programming instructions implementing in part or in full, the functionality described above.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:
1. A method, comprising:
  detecting, by a service processor of a host device, one or more network access settings associated with the host device to enable the service processor to access a network via a network access proxy, wherein the service processor is configured to operate independent of an application environment hosted by an application pro- cessor of the host device, wherein detecting the one or more network access settings comprises:
configuring, by the service processor, a packet filter of a network device to detect one or more packets that include an Internet Protocol (IP) address, and
analyzing, by the service processor, the detected one or more packets to determine the one or more network access settings; and
transmitting, by the service processor of the host device, an out-of-band signal to a management entity via the network access proxy based at least in part on the one or more detected network access settings.

2. The method of claim 1, wherein detecting the one or more network access settings comprises determining that a host operating system of the application environment is operational and configured to communicate with the network access proxy; and
wherein transmitting the out-of-band signal to the management entity comprises transmitting the out-of-band signal to the management entity via the host operating system.

3. The method of claim 1, wherein detecting the one or more network access settings comprises receiving the one or more network settings from a proxy watcher, wherein the proxy watcher is resident in a host operating system of the application environment.

4. The method of claim 1, wherein detecting the one or more network access settings comprises determining a location of the one or more network settings within a host operating system of the application environment.

5. The method of claim 1, wherein detecting the one or more network access settings comprises determining the one or more network access settings via a dynamic host configuration protocol.

6. The method of claim 1, wherein the analyzing comprises transmitting a message to the IP address to determine if it is associated with the network access proxy server.

7. The method of claim 1, further comprising:
displaying, by the service processor of the host, at least one of the one or more network access settings on a display of the host.

8. The method of claim 1, wherein detecting the one or more network access settings comprises, if the one or more network access settings are not determined by analyzing the detected one or more packets to determine the one or more network access settings, receiving the one or more network access settings via a user interface of a BIOS of the host device.

9. The method of claim 1, further comprising:
prior to transmitting, configuring the service processor to communicate directly with the proxy server independent of the application processor and the application processor of the host device based on the determined one or more network access settings.

10. The method of claim 1, wherein configuring, by the service processor, comprises:
configuring the network device to detect one or more packets transmitted by the application processor from the application environment.

11. The method of claim 1, wherein configuring, by the service processor, the packet filter of a network device to detect one or more packets comprises:
in the absence of network traffic through the network device of the host from the application processor, configuring the packet filter to receive one or more packets that are intended for one or more other devices communicatively coupled to the network.

12. The method of claim 1, further comprising:
if network traffic is not being transmitted by the application processor through the network device, causing the network device to receive network traffic that is intended for one or more other devices communicatively coupled to the network; and
analyzing the network traffic to determine the one or more network access settings associated with the host device to enable the service processor to access the network via a network access proxy independent of the application processor.

13. An article of manufacture including a non-transitory computer-readable medium having programming instructions stored thereon that, in response to execution by a service processor of a host device, enable the service processor to perform operations comprising:
causing a network device to store network traffic transmitted to a network by an application processor through the network device;
analyzing the stored network traffic to determine one or more network access settings associated with the host device to enable the service processor to access the network via a network access proxy, wherein the service processor is configured to operate independent of an application environment hosted by an application processor of the host device and is configured to access the network via the network access proxy while the application processor is operable and inoperable; and
transmitting an out-of-band signal to a management entity via the network access proxy based at least in part on the one or more detected network access settings.

14. The article of manufacture of claim 13, wherein detecting the one or more network settings comprises determining whether a host operating system of the application environment is operational and configured to communicate with the network access proxy; and
wherein transmitting the out-of-band signal to the management entity comprises transmitting the out-of-band signal to the management entity via the host operating system, if the host operating system is operational.

15. The article of manufacture of claim 13, wherein detecting the one or more network access settings comprises receiving the one or more network settings from a proxy watcher, if a host operating system is operational, wherein the proxy watcher is resident in the host operating system of the application environment.

16. The article of manufacture of 13, wherein detecting the one or more network access settings comprises determining a location of the one or more network settings within a host operating system of the application environment.

17. The article of manufacture of claim 13, prior to transmitting the out-of-band signal, transmitting a message to the network access proxy server to validate the determined network access settings.

18. A system, comprising:
an application processor;
an embedded processor coupled to the application processor, wherein the embedded processor configured to operate independent of the application processor; and
an storage device operatively coupled to the embedded processor and having instructions stored therein, which in response to execution by the embedded processor, enables the embedded processor to perform operations comprising:
detecting one or more network access settings associated with the system to enable the embedded processor to access a network via a network access proxy agent, wherein detecting comprises:

configuring a packet filter to filter one or more packets received via a network device, and analyzing the one or more filtered packets to determine the one or more network access settings; and transmitting an out-of-band signal to a management entity via the network access proxy based at least in part on the one or more detected network access settings.

19. The system of claim 18, wherein execution of the instructions by the embedded processor enables the embedded processor to perform further operations comprising:

retrieving data associated with the network proxy agent from a host operating system hosted by the application processor.

20. The system of claim 18, wherein execution of the instructions by the embedded processor enables the embedded processor to perform further operations comprising:

transmitting the one or more out-of-band messages via an operating system hosted via the application processor.

* * * * *